Figure 1:
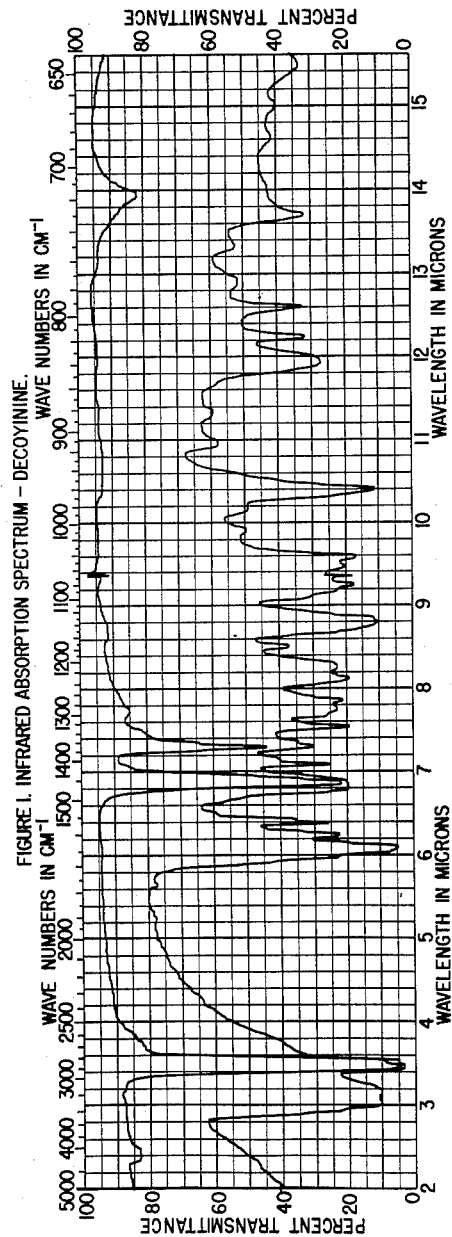

June 18, 1963  C. DE BOER ETAL  3,094,460
DECOYININE

Filed Jan. 20, 1959  2 Sheets-Sheet 1

CLARENCE DE BOER
ALMA DIETZ
LEROY E. JOHNSON
THOMAS E. EBLE
HERMAN HOEKSEMA
*INVENTORS*

BY EUGENE O. RETTER
GEORGE T. JOHANNESEN
*ATTORNEYS*

ULTRAVIOLET SPECTRA OF DECOYININE.

United States Patent Office 3,094,460
Patented June 18, 1963

3,094,460
DECOYININE
Clarence De Boer, Alma Dietz, Le Roy E. Johnson, and Thomas E. Eble, Kalamazoo, and Herman Hoeksema, Kalamazoo Township, Kalamazoo County, Mich., assignors to The Upjohn Company, Kalamazoo, Mich., a corporation of Delaware
Filed Jan. 20, 1959, Ser. No. 787,976
18 Claims. (Cl. 167—65)

This invention relates to a novel composition of matter and to the process for the production thereof. More particularly this invention relates to a new compound, decoyinine (antibiotic a14), and to the process for the production thereof.

Decoyinine is an elaboration product of *Streptomyces hygroscopicus* var. *decoyinine* having the property of adversely effecting growth of various organisms, particularly bacteria and fungi. It is distinguished from known antibacterial agents and antibiotics by its characteristic infrared and ultraviolet spectra, shown respectively in FIGURES 1 and 2, by its elemental constitution, and by its chemical and physical properties.

A culture of the living organism hereinafter identified as *Streptomyces hygroscopicus* var. *decoyinine* has been deposited with the Fermentation Division, Northern Utilization Research Branch, U.S. Department of Agriculture, Peoria, Illinois, and has been added to its permanent collection as NRRL 2666.

*Streptomyces hygroscopicus* var. *decoyinine* is a new variety of a known actinomycete. Its cultures have branching aerial mycelia, produce condia in tightly coiled hyphae arising from the aerial mycelium, and develop moist black patches in the sporulating areas as the culture ages.

*Streptomyces hygroscopicus* var. *decoyinine* shows close similarities to *Streptomyces endus* and *Streptomyces hygroscopicus* CBS as shown in Tables I and II. In Table I, these organisms are compared by the Dietz Ektachrome (positive color film transparencies) technique, noted in the Annals of the New York Academy of Science, vol. 60, art. 1, pp. 152 and 154, October 29, 1954.

In Table II, these organisms are compared according to their ability to utilize carbon compounds by the procedure of Pridham and Gottlieb [J. Bact. 56: 107–114 (1948)], with the modifications, noted in the printed German patent application No. 1,025,893.

TABLE II

Carbon Assimilation

| Carbon compounds | S. hygroscopicus var. decoyinine NRRL 2666 | S. endus NRRL 2339 | S. hygroscopicus CBS |
|---|---|---|---|
| Control | (−) | (−) | (−) |
| (1) d-Xylose | (+) | + | + |
| (2) l-Arabinose | (+) | + | + |
| (3) Rhamnose | (−) | + | + |
| (4) d-Fructose | (+) | + | + |
| (5) d-Galactose | (+) | + | + |
| (6) d-Maltose | (+) | + | + |
| (7) d-Mannose | + | + | + |
| (8) d-Glucose | (+) | + | + |
| (9) Sucrose | (+) | (+) | (+) |
| (10) Lactose | + | + | + |
| (11) Cellobiose | (+) | + | + |
| (12) Raffinose | + | + | + |
| (13) Dextrin | (+) | + | + |
| (14) Inulin | + | (+) | (+) |
| (15) Soluble starch | + | (+) | (+) |
| (16) Glycerol | (−) | + | + |
| (17) Dulcitol | (+) | (+) | (+) |
| (18) d-Mannitol | (+) | + | + |
| (19) d-Sorbitol | (+) | (+) | (+) |
| (20) dl-Inositol | (+) | (+) | (+) |
| (21) Salicin | (+) | (+) | (+) |
| (22) Phenol | − | − | − |
| (23) Cresol | − | − | − |
| (24) Sodium formate | (−) | (−) | (−) |
| (25) Sodium oxalate | (−) | (−) | (−) |
| (26) Sodium tartrate | (−) | (−) | (−) |
| (27) Sodium salicylate | − | − | − |
| (28) Sodium acetate | (+) | + | (+) |
| (29) Sodium citrate | (+) | + | + |
| (30) Sodium succinate | (+) | (+) | + |

NOTE.—+ equals positive assimilation; − equals negative assimilation; (−) equals negative assimilation, but only slight growth; (+) equals positive assimilation, but only slight growth.

Neither *S. endus* nor *S. hygroscopicus*, CBS, under conditions suitable for the production of decoyinine, produce decoyinine.

Further characteristics of *Streptomyces hygroscopicus* var. *decoyinine* are listed in Table III, which shows the

TABLE I

Ektachrome Comparison

| Medium | *Streptomyces hygroscopicus* var. *decoyinine* NRRL 2666 | | *Streptomyces endus* NRRL 2339 | | *Streptomyces hygroscopicus* CBS [1] | |
|---|---|---|---|---|---|---|
| | Surface | Reverse | Surface | Reverse | Surface | Reverse |
| Bennett's | Gray white | Honey tan | Gray white | Deep honey tan | Gray flecked with white | Deep honey tan. |
| Czapek's sucrose | do | Honey tan with gray | Fair gray white | Pale honey tan flecked with gray | Fair gray white | Pale honey tan flecked with gray. |
| Maltose tryptone | do | do | White flecked with gray | Honey tan | Gray white | Deep tan. |
| Peptone iron | White | Honey tan | White | do | White | Honey tan. |
| Waksman's tyrosine | do | Colorless | do | Pale honey tan | do | Pale honey tan. |
| Casein starch | Gray | Pale honey tan | do | do | Gray flecked with white | Pale honey tan flecked with gray. |

[1] CBS is Centraalbureau voor Schimmelculture at Baarn, Holland.

characteristic growth of the organism at 28° C. on sixteen standard media.

The organism, S. hygroscopicus No. 6A–706, that produces the Angustmycins, is also distinctly different from

TABLE III

Growth Characteristic

| Medium [1] | Vegetative growth | Aerial growth | Other |
|---|---|---|---|
| (1) Bennett's agar | Good | Good. Mottled white to gray to black. | Yellow reverse and pigment. |
| (2) Czapek's sucrose agar | do | Good. Two kinds of colonies: (a) with gray aerial growth, (b) white crackled. | Cream reverse. Pale yellow pigment. |
| (3) Maltose tryptone agar | do | do | Yellow to gray reverse. Yellow pigment. |
| (4) Peptone iron agar | Fair | None to trace white | Yellow reverse and pigment. |
| (5) 0.1% Tyrosine agar | do | Fair gray white | Tan reverse and pigment. |
| (6) Casein starch agar | do | Trace gray white | Colorless reverse. Good starch hydrolysis. |
| (7) Nutrient starch agar | do | Fair white | Cream reverse. Good starch hydrolysis. |
| (8) Skim milk agar | Good | do | Cream reverse. Good casein hydrolysis. |
| (9) Calcium malate agar | Fair | Trace gray white | Colorless reverse. |
| (10) Glucose asparagine agar | do | None | Do. |
| (11) Plain gelatin stab | do | do | Yellow pigment. Very slight liquifaction. |
| (12) Nutrient gelatin stab | do | do | Do. |
| (13) Tryptone broth | Fair. Flocculent at base | | |
| (14) Litmus milk | Fair | Trace gray white | No peptonization. No change. |
| (15) Nutrient nitrate broth | Fair. Flocculent at base | None | No reduction. |
| (16) Synthetic nitrate broth | Fair. Few surface colonies. Flocculent at base. | Very slight trace white | Do. |

[1] The media are noted in the printed German Patent Application No. 1,025,893.

On Bennett's and Czapek's sucrose agars S. hygroscopicus var. decoyinine has good vegetative and aerial growth at 18–28° C. At 37° vegetative growth is good but wrinkled and pasty, and there is trace white aerial growth. The culture does not grow at 55° C.

S. hygroscopicus var. decoyinine is distinctly different from the reported variants of S. hygroscopicus in the literature both in regard to the characteristics of the organism and the antibiotics produced. Thus, while variants or strains of S. hygroscopicus are reported to produce other antibiotics; namely, hygromycins, marcomycin, carbomycin, hygroscopins, and angustmycins, these antibiotics are distinctly different from decoyinine, as shown by the following comparison:

TABLE IV

| | |
|---|---|
| Hygroscopin A | $C_{13}H_{24}N_2O_3$ |
| Hygroscopin B | $C_{15}H_{28}N_2O_3$ |
| Carbomycin | $C_{42}H_{67}NO_{16}$ |
| Hygromycin | $C_{12}H_{29}NO_{12}$ |
| Hygromycin B | $C_{15}H_{28}N_2O_{9-10}$ |
| Marcomycin | $C_{15}H_{30}N_2O_9$ |
| Angustmycin A | $C_{15}H_{18-20}N_6O_5$ |
| Angustmycin C | $C_{11}H_{15}N_5O_5$ |
| Decoyinine | $C_{11}H_{15}N_5O_4$ |

Angustmycins A and C, which are reported to be produced by S. hygroscopicus 6A–704, by H. Yüntsen et al. in Japan Journal of Antibiotics, Series A, vol. 7, No. 4, August 1954, pages 113 and 116; Japan Journal of Antibiotics, Series A, December 1956, p. 195, and Bull. Agr. Chemi. Soc. Japan, vol. 21, No. 4, pp. 261–262, 1957, also differ in other significant respects, as shown in the following Table V:

TABLE V

| Characteristic | Compound | | |
|---|---|---|---|
| | Decoyinine | Angustmycin A | Angustmycin C |
| Empirical formula | $C_{11}H_{15}N_5O_4$ | $C_{14}H_{18-20}N_6O_5$ | $C_{11}H_{15}N_5O_5$. |
| Percent nitrogen of anhydrous crystal. | 25.03 | 23.60 | 23.19. |
| Melting point of anhydrous crystal. | 183–186° C | 169.5–171° C | 202–204° C. |
| Optical properties | Active | Active | Inactive. |
| Titration equivalent | 283 | 340 | 307. |
| Molecular weight determination. | 215–216 | 350–352 | 297. |
| Probable sugar moiety. | $C_6H_{12}O_5$ | $C_8H_{10}O_5$ | Not known or reported. |
| Forms on acetylation. | Penta acetyl M.P. 152–153° C. and Tetra acetyl M.P. 65° C. | Triacetyl M.P. 188–188.5° C. | Do. |

S. hygroscopicus var. decoyinine. The differences in carbon assimilation are shown in Table VI.

TABLE VI

Carbon Assimilation

| | S. hygroscopicus var. 6A–704 [1] | S. hygroscopicus var. decoyinine [2] |
|---|---|---|
| Control | − | (−) |
| d-Xylose | − | (+) |
| l-Arabinose | − | (+) |
| Rhamnose | − | (−) |
| d-Galactose | ± | (+) |
| d-Glucose | + | (+) |
| Sucrose | ± | (+) |
| Lactose | ± | + |
| Raffinose | + (−) | + |
| d-Mannitol | + | (+) |
| dl-Inositol | − | (+) |
| Salicin | − | (+) |

[1] Key for signs in this column is as follows: ++ Good growth and positive utilization. + Moderately good growth and positive assimilation. ± Faint growth, probably possible assimilation. (−) Sometimes no growth, indefinite utilization. − No growth, no utilization.
[2] Key for signs in this column is as follows: + Positive assimilation. − Negative assimilation, no growth. (−) Slight growth, no assimilation. (+) Positive assimilation, only slight growth.

Differences in growth characteristics are shown in Table VII.

TABLE VII

Growth Characteristics

| Media | Organism | |
|---|---|---|
| | S. hygroscopicus var. decoyinine NRRL 2666 | S. hygroscopicus var. 6A–704 |
| Glucose asparagine agar | No aerial growth | White powdery aerial growth. |
| Tyrosine agar | Pigment | No soluble pigment. |
| Gelatin stab | Yellow pigment | No soluble pigment formed. |
| Bennett's agar | Yellow reverse and pigment. | Growth brown, no soluble pigment. |

Decoyinine has the antibacterial spectrum in vivo, shown in Table VIII:

TABLE VIII

*Therapeutic Efficacy of Decoyinine in Experimentally Infected Mice*

| Organism | Route of administration | CD$_{50}$ in mg./kg. of decoyinine |
|---|---|---|
| S. hemolyticus | Sub Q | 22.5 (14.8–30.2) |
|  | Oral | 50.0 (39.0–61.0) |
| S. aureus | Sub Q | 200 |
|  | Oral | 83 (57–109) |
| D. pneumoniae I | Sub Q | 400 |
|  | Oral | 800 |
| D. pneumoniae III | Sub Q | 400 |
|  | Oral | 800 |
| K. pneumoniae | Sub Q | 400 |
|  | Oral | 800 |
| P. multocida | Sub Q | 305 (225–385) |
|  | Oral | 238 (163–313) |
| P. vulgaris | Sub Q | 400 |
|  | Oral | 800 |
| P. aeruginosa | Sub Q | 355 (287–423) |
|  | Oral | 161 (96–226) |
| S. paratyphi B | Sub Q | 482 |
|  | Oral | 404 |
| S. typhi | Sub Q | 400 |
|  | Oral | 800 |
| E. coli | Sub Q | 119 |
|  | Oral | 86 |

Decoyinine has shown marked activity against the following microorganisms.

Bacteria:
  Mycobacterium ranae
  Mycobacterium phlei
  Diplococcus pneumoniae
  Streptococcus hemolyticus
  Staphylococcus aureus
  Pseudomonas aeruginosa
Actinomycetes:
  Nocardia asteroides
Fungi:
  Trichophyton rubrum
  Histoplasma capsulatum
  Blastomyces dermatitidis Decoyinine can be produced by cultivating *S. hygroscopicus* var. *decoyinine* or a variant thereof, which will produce decoyinine, in an aqueous nutrient medium, under submerged aerobic conditions, and preferably, in a nutrient medium containing an assimilable carbohydrate and a nitrogen compound or proteinaceous material. Although there are a number of suitable media available (certain culture media are preferred) for economy of production, maximum yield, and ease of isolation, the presently preferred sources of carbohydrates are glucose, dextrin, molasses, corn meal (refined and unrefined), and starch (bolted and soluble), including combinations thereof. Other suitable carbon sources are maltose, galactose, mannitol, soybean oil, animal and vegetable oils, and the like. The preferred sources of nitrogen are protein sources such as cotton seed meal, soybean meal, fish meal, defatted soybean meal, peptone, and the like. Other suitable sources are peanut meal, Brewer's yeast (dried yeast cells obtained from a beer fermentation) or yeast extract, corn gluten meal, corn steep liquor, fish stick liquor, animal stick liquor, distiller's solubles, trypticase, tryptone, beef extract, N–Z amine A, N–Z amine B, proteolized milk and egg products, and the like. Combinations of two or more of these nitrogen sources can be used advantageously.

Nutrient inorganic salts, for example, salts capable of yielding ions such as potassium, sodium, calcium, phosphate, sulfate, and the like, can be incorporated advantageously in the medium. Essential trace elements such as zinc, magnesium, manganese, cobalt, iron, and the like, can also be included in the culture medium for growing *Streptomyces hygroscopicus* var. *decoyinine*. Such trace elements are commonly supplied as impurities incidental to the addition of the constituents of the medium.

In a preferred method of fermentation of the microorganism *S. hygroscopicus* var. *decoyinine*, the culture medium is maintained at a temperature between about 24 and about 37 degrees centigrade. Preferably the inoculum is incubated in about 28 degrees centigrade and the inoculated fermentor is incubated at about 28 to 32 degrees centigrade, for a period between about two and seven days, until there is sufficient decoyinine in the fermented beer to be harvested.

For maximum growth and development of *S. hygroscopicus* var. *decoyinine*, the culture medium, prior to inoculation with the microorganism, should be adjusted to a pH between about 6.5 and about 7.6. Advantageously the pH is controlled close to neutrality during the fermentation.

Submerged, aerobic culture conditions are the conditions of choice for the production of large amounts of decoyinine. For the preparation of limited amounts, shaken flasks and cultures in bottles can be employed. When growth is carried out in large vessels and tanks, it is preferable to use the vegetative form of the microorganism for inoculation to avoid a pronounced lag in the production of decoyinine and the attendant inefficient utilization of the equipment. Accordingly, it is desirable first to produce a vegetative inoculum of the microorganism by inoculating a relatively small amount of culture medium with material scraped from a nutrient agar slant of the microorganism, or with an aliquot of a soil culture, and when a young, active, vegetative inoculum has been secured, to transfer the vegetative inoculum aseptically to large vessels or tanks. The medium in which the vegetative inoculum is produced can be the same as, or different from, that utilized for the production of decoyinine.

The rate of production of decoyinine and the concentration of decoyinine in the culture medium are readily followed during the growth period of the microorganism by testing samples of the culture medium for antibacterial activity against an organism known to be susceptible to decoyinine, e.g., *Mycobacterium phlei*, by standard agar diffusion, by a turbidimetric test procedure or by testing by paper chromatography followed by ultraviolet assay. In general, maximum production of decoyinine, after inoculation of the culture medium, occurs between about two and about ten days when submerged aerobic culturing is employed.

*S. hygroscopicus* var. *decoyinine*, on fermentation, produces decoyinine, psicofuranine, and adenine. Adenine is a known old compound which has no antibiotic activity. Psicofuranine is a new antibiotic material which has an optical rotation, [α]$_D^{25}$, in dimethylformamide of minus 68 degrees and the following structural formula:

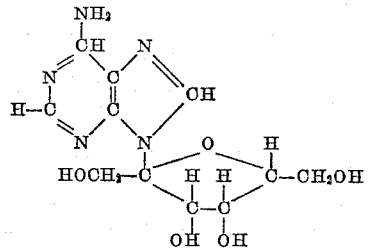

Because of the biological activity of decoyinine both in vitro and in vivo, the antibiotic is useful in many non-human infections. It has not yet been established as effective in human therapy.

Decoyinine can also be used as a feed supplement for promoting the growth of animals and poultry either alone or in combination with other antibiotics. Its use is also indicated as an additive for tuberculosis room and instrument sterilization, and for use in biological media. Decoyinine can also be used in teaching, research, and analysis.

The LD$_{50}$ of decoyinine in mice, both orally and subcutaneously, is greater than 2500 milligrams per kilogram. The maximum tolerated dose orally is greater than 800 milligrams per kilogram per day and subcutaneously greater than 320 milligrams per kilogram per day for at least a four day period.

Decoyinine, including derivatives thereof, is useful in combating diseases caused by bacterial and fungal infections in animals. For this use, the antibiotic is associated with a pharmaceutical carrier which may be either a solid material, a powder, or a liquid. The compositions can take the form of tablets, effervescent tablets, powders, granules, capsules (both hard and soft shell capsules), suspensions in edible oils, aqueous suspenions, or other dosage forms which are particularly useful for oral administration. Liquid diluents are employed in sterile conditions for parenteral use. Such a medium can be a sterile solvent or a sterile suspensing vehicle such as an injectable oil or water with or without hydrophilic colloids such as sodium carboxymethyl-cellulose, polyvinyl pyrrolidone, gelatin, alginates, tragacanth, and like suspending and/or dispersing agents. Various solid pharmaceutical compositions can be prepared by mixing the antibiotic with solid diluents and/or tableting adjuvants such as corn starch, lactose, talc, stearic acid, dicalcium phosphate, magnesium stearate, gums, and the like. Any of the encapsulating or tableting materials used in pharmaceutical practice can be employed where there is no incompatibility with the antibiotic. The materials can be tableted or placed in the usual capsule of absorbable material such as the usual gelatin capsule and administered in that form. Decoyinine including derivatives thereof, illustratively the acetate or the succinate can be prepared in the form of a suspension in a suitable fixed oil containing about two percent aluminum monostearate as a suspending agent. Such a suspension can be given orally as made or can be encapsulated. The antibiotic in the form of ointments including petrolatum type grease base, polyethylene glycol water-soluble bases, creams, and water-oil emulsions and lotions are useful topically. Other useful topical preparations with this antibiotic include ear drops, eye drops, aerosols, nasal sprays, troches, and suppositories. For veterinary use, the antibiotic can be administered in the form of bougies, mastitis ointments, oil suspensions, aqueous solutions and suspensions, and the like.

Because of its marked bactericidal activity and very low toxicity, decoyinine and its derivatives are useful as agents in the treatment of various diseases. Thus, either alone or in combination with sulfa compounds such as sulfadiazine, sulfamerazine, sulfanilamide, sulfamethazine, sulfacetamide, sulfamethylthiadiazole (in a ratio of about 1 part of the antibiotic to two parts of the total sulfa), and the like, or with other antibiotics such as tetracycline, oxytetracycline, chlortetracycline, penicillins, novobiocin, neomycin, psicofuranine, erythromycin, streptomycin, bacitracin, polymyxin, chloramphenicol, kanamycin, nystatin, streptozotocin, or the like, the antibiotic is useful in the treatment of a variety of infections especially those caused by Streptococcus and Staphylococcus organisms. The antibiotic is likewise useful in combination with the various vitamins such as thiamine, riboflavin, ascorbic acid, niacinamide, pyridoxine, pantothenic acid, or pantothenate salts, vitamin $B_{12}$, folic acid, and the like. Other therapeutically useful materials can also be combined with the antibiotic. Decoyinine and its derivatives are also useful in combination with corticoids, such as cortisone, hydrocortisone, prednisone, and prednisolone, including esters thereof, e.g., the acetate, cyclopentylpropionate, succinate and the sodium salt, and the like; and the fluoro, methyl, and hydroxy analogues of the same, such as 6α-fluorohydrocortisone, 16-hydroxy-9α-fluorohydrocortisone, and 16-methyl-9α-fluoroprednisolone, and the esters thereof.

Decoyinine can be removed from the culture medium by extractive or absortive techniques including adsorption on carbon or like capillary absorbent, and elution therefrom with a suitable eluting agent. Solvent extraction procedures are preferred for commercial production inasmuch as they are less time consuming and expensive, and higher recovery yields are obtained thereby.

In an extraction procedure for recovery of decoyinine from the fermented nutrient medium the whole beer is filtered at an acid pH, preferably at about pH 2. The clear filtrate is adjusted to the alkaline side, preferably at about pH 10, and adsorbed on an adsorbent, preferably carbon, to about one percent activated carbon. The cake is slurried in an organic solvent, such as acetone; the solvent is separated from the cake, and the solvent is distilled to an aqueous concentrate which is filtered, neutralized, and freeze dried. The freeze dried material is redissolved in water at about 50 degrees centigrade and allowed to cool to room temperature whereupon crystallization takes place.

Decoyinine can be further purified by counter-current distribution, counter-current liquid-liquid extraction or other means and then recrystallized from a suitable solvent.

Decoyinine exhibits a typical picture in a bioautographed papergram as given below. Location of zones is by bioautography with *Mycobacterium phlei* or *M. ranae*.

The solvent systems and $R_f$ values are as follows (the remainder being water):

(1) 81% n-butanol; $R_f=0.30$
(2) 81% n-butanol, 0.25% p-toluene sulfonic acid; $R_f=0.35$
(3) 81% n-butanol, 2% piperidine; $R_f=0.37$
(4) 96% water, 4% n-butanol; $R_f=0.63$
(5) 96% water, 4% n-butanol, 0.25% p-toluene sulfonic acid; $R_f=0.64$ The $R_f$ value of 6-amino-9-D-psicofuranosyl purine, or psicofuranine, also produced by *S. hygroscopicus*, NRRL 2666, in solvent system #4 is 0.13. The $R_p$ value of decoyinine is 2.85 (p is the reference compound psicofuranine).

Decoyinine, as well as psicofuranine is produced as an elaboration product by the fermentation of *S. hygroscopicus* var. *decoyinine*. Decoyinine can be separated from psicofuranine by Craig countercurrent distribution using a solvent system of equal parts of n-butanol and water. The distribution will yield a fraction at K=0.3 which is psicofuranine and a fraction at K=0.7 which is decoyinine. Both decoyinine and psicofuranine yield adenine on acid hydrolysis. Decoyinine is soluble in the range of 1 to 10 mg. per ml. in water, lower alkanols such as ethanol, methanol, and butanol, lower alkanones such as acetone, and esters such as ethyl acetate, and more soluble in organic solvents such as dimethylformamide, dimethyl sulfoxide, and dimethyl acetamide.

Acetylation of decoyinine by the method of Yüntsen produces two products, decoyinine pentaacetate, $$C_{21}H_{25}N_5O_9$$

and decoyinine tetraacetate, $C_{19}H_{23}N_5O_8$. The acetates are useful in upgrading crystalline decoyinine. Upon acetylation of a material such as Preparation 1a, the decoyinine will form penta and tetra decoyinine compounds, while the psicofuranine will form penta and hexa psicofuranine compounds. These acetates can be separated by countercurrent distribution, due to the greater difference between the "K" values of the acetates than between the "K" values of the parent compounds. After separation, the acetates can be converted back to their parent compounds, thereby resulting in a purification of decoyinine.

Methanolysis cleaves adenine from decoyinine. Our data indicate that the sugar moiety of decoyinine is $C_6H_{12}O_5$ whereas angustmycin A yields $C_8H_{10}O_5$. Sodium borohydride fails to reduce decoyinine and this shows the absence of an aldo-ketose group such as is found in hygromycin.

Figure 2:
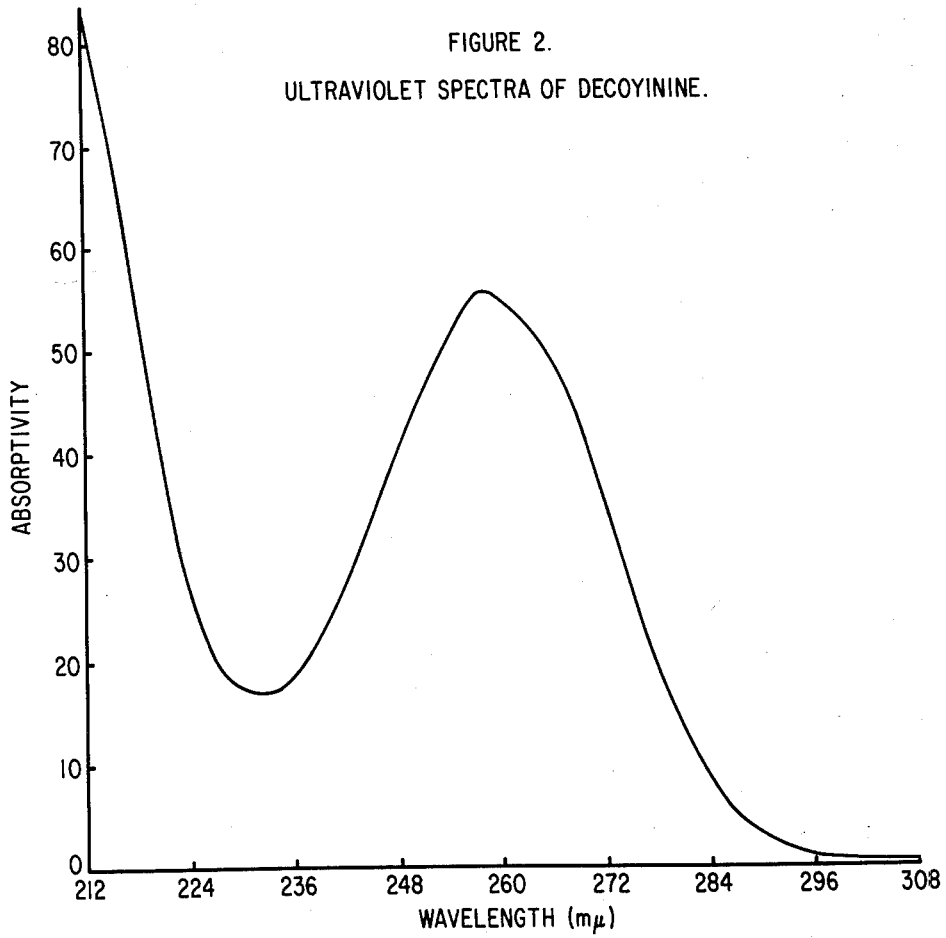

Decoyinine occurs as a crystalline hydrate, Preparation 2e, having a melting point of 124–128 degrees centigrade and as an anhydrous crystal, Preparation 2f, having a melting point 183–186 degrees centigrade. Decoyinine is also characterized by the ultraviolet maximum at 258 millimicrons, $a=56$, of the anhydrous crystalline material in alcoholic 0.01 N sulfuric acid as shown in FIGURE 2; $[\alpha]_D^{25}=+18.6$ degrees in dimethyl formamide and +37 degrees in dimethyl sulfoxide.

The infrared spectrum shows multiple OH/NH bands, as well as a series of bands indicating a purine ring structure, as shown on the anhydrous crystalline decoyinine in FIGURE 1. The infrared absorption spectrum of decoyinine in a mineral oil suspension exhibits characteristic absorption bands expresed in reciprocal centimeters at the following frequencies: 3420, 3390, 3300, 3170, 3070, 2710, 2640, 1690, 1672, 1655, 1645, 1605, 1573, 1565, 1515, 1420, 1335, 1310, 1300, 1280, 1238, 1218, 1181, 1143, 1102, 1094, 1085, 1073, 1060, 1047, 1013, 985, 965, 915, 883, 838, 815, 790, 772, 746, and 725.

The following examples are illustrative of the process and products of the present invention, but are not to be construed as limiting. All percentages are by weight and all solvent mixture proportions are as volume by volume unless otherwise noted.

EXAMPLE 1

A. *Laboratory Scale Fermentation*

S. hygroscopicus var. decoyinine, NRRL 2666, was cultured at 28 degrees centigrade on sterile slants of the following medium:

|  | Grams |
|---|---|
| Maltose | 10 |
| Tryptone | 5 |
| Dipotassium hydrogen phosphate | 0.5 |
| Sodium chloride | 0.5 |
| Hydrated iron sulfate | Trace |
| Agar | 15 |

Distilled water to make 1 liter.

for seven days, when sporulation was complete. The spores from such an agar slant were used to inoculate 100 milliliters of following seed medium in a 500-milliliter flask:

|  | Grams |
|---|---|
| Glucose | 25 |
| Soy peptone | 10 |
| Corn steep liquor | 3 |
| Yeast extract | 3 |
| N-Z amine A [1] | 2 |
| Ammonium sulfate | 3 |
| Magnesium sulfate | 0.2 |
| Sodium chloride | 0.1 |
| Hydrated iron sulfate | 0.02 |
| Hydrated manganese sulfate | 0.003 |
| Hydrated zinc sulfate | 0.004 |
| Dihydrogen potassium phosphate | 1.9 |
| Monohydrogen potassium phosphate | 1.1 |

Adjusted to pH 7.2 before sterilizing.
Water to make 1 liter.

[1] Enzymatic digest of casein.

which was incubated for 72 hours at 28 degrees centigrade on a rotary shaker at 250 r.p.m.

The culture thus obtained was used to inoculate the following sterile fermentation medium:

|  | Grams |
|---|---|
| Kay-soy [1] | 30 |
| Ammonium sulfate | 5 |
| Glycerol | 40 |
| Cerelose | 20 |
| Calcium carbonate | 4 |

Water to make 1 liter.
(pH adjusted to 7.2 before sterilizing.)

[1] Fat extracted soybean meal, finely milled which was then incubated in 100 milliliter aliquots in 500 milliliter Erlenmeyer flasks for five days (at thirty degrees centigrade) on a rotary shaker at 250 r.p.m.

An aliquot of the whole beer was fractionated by paper chromatography. The zone of decoyinine was located by bioautography with *Mycobacterium phlei*. The zones of psicofuranine and adenine, which were also present in the whole beer, were located by a Cary spectophotometer by their absorption at 262 mµ. The relative mobilities $(R_f)$ of the fractions, in a solvent system consisting of 81% n-butanol, 2% piperidine, and 17% water, are decoyinine $R_f=0.37$, psicofuranine $R_f=0.13$, and adenine $R_f=0.25$.

EXAMPLE 2

A. *Plant Scale Fermentation*

The inoculated medium, in a 500 milliliter seed flask, as described in Example 1, was incubated for 48 hours at 30 degrees centigrade. Then 75 milliliters of it were used to inoculate 12 liters of the same medium in a seed bottle. The seed bottle was agitated with a sweep stirrer at 280 r.p.m., aerated with 6 standard liters of air per minute, and fermented at 30 degrees centigrade for two days when it was used as inoculum for 250 liters of a definitive sterile fermentation medium of the same composition as used in Example 1, in a 100 gallon tank. The medium was adjusted to pH 7.2 with NaOH and then sterilized. After sterlizing the pH was 7.8. The fermentor was agitated with an open turbine at 280 r.p.m., aerated with 100 standard liters of air per minute, and fermented at 30 degrees centigrade for 4 days at which time the decoyinine was harvested.

B. *Extraction of Crude Crystalline Decoyinine*

The whole beer, of 250 liters, was adjusted to pH 2.0 with sulfuric acid, 22 pounds of diatomite were added and the material was filtered. The filtrate was mixed with 11 pounds of activated carbon and 16 pounds of diatomite and the mixture was filtered. The clear filtrate was discarded, the decoyinine being in the carbon cake. The carbon cake was eluted three times with 5 gallons each time of acetone to remove the decoyinine. The acetone solution was concentrated at 38 to 48 degrees centigrade to an aqueous solution of 4 liters. The aqueous solution was adjusted with thirteen milliliters of concentrated sulfuric acid to pH 7.0 and then freeze dried to yield 414 grams of solid crude decoyinine. The freeze dried material was dissolved in 2 liters of water at 50 degrees centigrade and allowed to cool to room temperature to effect crystallization of crude crystalline decoyinine. Preparation 2a, which had a melting point of 198–200 degrees centigrade.

C. *Fractionation of Crude Crystalline Decoyinine*

One gram of Preparation 2a was fractionated by Craig counter-current distribution using a solvent system consisting of equal parts of n-butanol and water through 150 transfers. Three fractions were obtained which on evaporation of the solvent gave crystalline products as shown in Table X.

TABLE X

|  | Psicofuranine, preparation 2b | Monohydrate decoyinine, preparation 2c | Adenine, preparation 2d |
|---|---|---|---|
| Fraction | First, K=.282 | Second, K=0.705 | Third, K=1.5. |
| Weight recovered, mg | 388 | 260 | 110. |
| Calculated percent of prep. 2a | 44 | 34 | 22. |
| Melting point, ° C | 209–210 | 124–125 | 292–295. |
| U.V. maxima at 262 mµ in water | $a=61$ | $a=57$ | $a=105$. |
| $[\alpha]_D^{25}$ in water | −46° | −41° |  |
| Elemental analyses: |  |  |  |
| C | 45.82 | 44.32 |  |
| H | 5.18 | 4.94 |  |
| O | 28.63 | 26.67 |  |
| N | 23.04 | 23.55 | 49.5. |

D. *Other Fractionations of Crude Crystalline Decoyinine*

A one gram aliquot of crude crystalline decoyinine, prepared by the procedure of part B was fractionated in a 200-tube Craig counter-current distribution machine for 200 transfers in the same solvent system as used in part C. The solids determination indicated three weight peak fractions: $K=0.29$. Psicofuranine; $K=0.73$ decoyinine; and $K=1.69$, adenine. Each of the fractions was evaporated to dryness. The decoyinine was recrystallized from water to yield 210 milligrams of hydrated crystalline decoyinine, Preparation 2e, which melted at 124–126 degrees centigrade. The elemental analysis of Preparation 2e, after drying at 60 degrees centigrade, was as follows:

Calculated for $C_{11}H_{15}N_5O_4$: C, 46.97; H, 5.38; N, 22.75; O, 24.92. Found: C, 46.02; H, 5.16; N, 23.29; O, 24.90 (direct).

The ultraviolet spectrum of Preparation 2e showed a maxima at 261 m$\mu$, $a=53.2$ in 0.01 N potassium hydroxide and at 259 m$\mu$, $a=50.8$ in 0.01 N sulfuric acid.

In another fractionation, 40 grams of crude decoyinine prepared according to part B, yielded 7.8 grams of hydrated crystalline decoyinine, similar to Preparation 2e, one gram of which was recrystallized from 40 milliliters of absolute ethanol to yield anhydrous crystalline decoyinine, Preparation 2f, which melted at 183–186 degrees centigrade. After drying at 60 degrees centigrade, Preparation 2f, had the following elemental analysis: C, 47.11; H, 5.03; N, 25.03; O, 23.01 (direct). The infrared absorption spectrum and ultraviolet spectrum of Preparation 2f are shown in the drawings, FIGURES 1 and 2, respectively.

E. Fractionation by Liquid-Liquid Extraction

Crude crystalline decoyinine prepared according to part B was fractionated by liquid-liquid countercurrent extraction. The solvent system consisted of equal parts of n-butanol and water. One hundred grams of crude crystalline decoyinine was dissolved in one liter each of hot upper and lower phases of the solvent system. This solution was used as feed for the column. The effluent of the liquid-liquid counter-current extraction column was followed by ultraviolet analysis, solids, and bioassay. There was crystallized from the bioactive fraction of the effluent 22.5 grams of decoyinine, Preparation 2g, which melted at 125–130 degrees centigrade and had an optical rotation of $[\alpha]_D^{25}=+35.6$ (1% in water).

EXAMPLE 3

To a solution of 2 grams of Preparation 2f in 50 milliliters of pyridine, was added 25 milliliters of acetic anhydride. The mixture was stored for seven days at 25 degrees centigrade. Eighteen grams of cracked ice were added to the mixture which was stirred for one and one-half hours, after which it was concentrated to a thick syrup under high vacuum. The syrup was dissolved in chloroform, washed with water and 0.03 N sulfuric acid, dried over sodium sulfate, and evaporated to dryness. The dried syrup was dissolved in ether and precipitated therefrom by the addition of hexane to yield 1.7 grams of a white solid, Preparation 3a. Preparation 3a was further purified by Craig countercurrent distribution wherein the solvent system water:ethanol:acetate:cyclohexane in the volume proportions 30:20:25:25 was used. After 1000 transfers two fractions were obtained. The first fraction at $K=1.86$, was crystallized from water to yield 420 milligrams of a material, Preparation 3b, which had a melting point 152–153 degrees centigrade and an elemental analysis which corresponds to decoyinine pentaacetate:

Calculated for $C_{21}H_{25}N_5O_9$: C, 51.32; H, 5.13; N, 14.25; O, 29.32. Found: C, 51.80; H, 4.71; N, 13.84; O, 30.50 (direct).

The second fraction at $K=0.5$ was crystallized from ethyl acetate-hexane to yield 600 milligrams of a material, Preparation 3c, which had a melting point of about 65 degrees centigrade and an elemental analysis which corresponds to decoyinine tetraacetate.

Calculated for $C_{19}H_{23}N_5O_8$: C, 50.76; H, 5.16; N, 15.58; O, 28.48. Found: C, 50.95; H, 4.59; N, 15.24; O, 28.81 (direct).

In a like manner other acylations of decoyinine can be made, particularly with the lower hydrocarbon carboxylic acid acylating agents by reacting the appropriate acid anhydride, or acid halide, such as propionic anhydride, acrylic anhydride, butyric anhydride, benzoic anhydride, benzoyl chloride, acetyl chloride, caproyl bromide with decoyinine in pyridine solution. The lower hydrocarbon carboxylic acid acylates can be used in place of decoyinine.

The process of acylation can be applied to crude preparations of decoyinine advantageously as means of upgrading decoyinine. Thus the acylated decoyinine can be separated from the reactive mixture, purified, and then hydrolyzed with dilute aqueous alkali to yield purified decoyinine. In this way decoyinine is readily separated from non-acylatable impurities and advantage is taken of the change in physical properties due to acylation.

EXAMPLE 4

10,000 oral tablets each containing 500 milligrams of decoyinine were prepared from the following types and amounts of materials:

| | Grams |
|---|---|
| (1) Decoyinine, crystalline | 5000 |
| (2) Lactose | 1500 |
| (3) Corn starch | 250 |
| (4) Talc | 100 |
| (5) Magnesium stearate | 50 |

Finely powdered materials 1, 2, and 3 were mixed thoroughly, slugged, and then granulated; the granules were mixed with materials 4 and 5 and tableted. The tablets, when administered, were stable and showed pronounced antibiotic activity.

Similar results were obtained with tablets made using 2500 grams of decoyinine and 2500 grams of psicofuranine in place of the 5000 grams of decoyinine.

Similar results were obtained with tablets made using 2500 grams of decoyinine and 2500 grams of erythromycin in place of the 5000 grams of decoyinine.

Similar results were obtained with tablets made using 2500 grams of decoyinine and 2500 grams of nystatin in place of the 5000 grams of decoyinine.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A composition of matter, decoyinine, which in its essentially pure crystalline form is characterized by a melting point of 183–186° C.; a titration equivalent of 283; a molecular weight determination of 215–216; an elemental analysis as follows: C=47.11%, H=5.03%, N=25.03%, O=23.01%; the absence of an aldo-ketose group; an optical rotation $[\alpha]_D^{25}=+18.6$ in dimethyl formamide; exhibiting characteristic absorption in the infrared spectrum as shown in FIGURE 1, and in the ultraviolet spectrum shown in FIGURE 2, of the drawings; said composition of matter being further characterized in that on acid hydrolysis it yields adenine.

2. Crystalline decoyinine, as defined in claim 1.

3. The tetraacetyl derivative of decoyinine, as defined in claim 1, having in its pure crystalline form the molecular formula $C_{19}H_{23}N_5O_8$ and a melting point of 152–153° C.

4. The pentaacetyl derivative of decoyinine, as defined in claim 1, having in its pure crystalline form the molecular formula $C_{21}H_{25}N_5O_9$ and a melting point of about 65° C.

5. A composition of matter comprising decoyinine, as defined in claim 1, and an excipient.

6. A composition of matter consisting essentially of decoyinine, as defined in claim 1.

7. The lower hydrocarbon in carboxylic acid esters of decoyinine, as defined in claim 1.

8. A composition of matter selected from the group consisting of (1) decoyinine, as defined in claim 1, and (2) the lower hydrocarbon carboxylic acid esters thereof.

9. A process which comprises cultivating *Streptomyces hygroscopicus* var. *decoyinine* in an aqueous nutrient medium under aerobic conditions until substantial antibiotic activity is imparted to said medium by production of decoyinine and isolating decoyinine from the culture medium.

10. A process which comprises cultivating under aerobic conditions *Streptomyces hygroscopicus* var. *decoyinine* in an aqueous nutrient medium containing assimilable carbohydrate and nitrogenous material at a temperature of about 25° C. to about 37° C. for a period between about two and about ten days until substantial antibiotic activity is imparted to said medium by production of decoyinine, separating the decoyinine from the culture medium, and isolating decoyinine therefrom.

11. A composition of matter comprising decoyinine, as defined in claim 1, as an essential active ingredient and a pharmaceutically acceptable carrier.

12. A composition comprising decoyinine, as defined in claim 1, and a pharmaceutically acceptable solid carrier.

13. A composition of matter comprising decoyinine, as defined in claim 1, and 6-amino-9-D-psicofuranosyl purine.

14. A composition of matter comprising decoyinine, as defined in claim 1, and psicofuranine in the proportions from about five to about 95 parts of decoyinine to about 95 to about five parts of 6-amino-9-D-psicofuranosyl purine.

15. A composition of matter comprising decoyinine, as defined in claim 1, and erythromycin.

16. A composition of matter comprising decoyinine, as defined in claim 1, and erythromycin in the proportions from about five to about 95 parts of decoyinine to about 95 to about five parts of erythromycin.

17. A composition of matter comprising decoyinine, as defined in claim 1, and nystatin.

18. A composition of matter comprising decoyinine, as defined in claim 1, and nystatin in the proportions from about five to about 95 parts of decoyinine to about 95 to about five parts of nystatin.

References Cited in the file of this patent

Yuntsen et al.: J. Antibiotics, Ser. A, vol. 7, No. 4, pp. 113–119, 1954.

Yuntsen et al.: J. Antibiotics, Ser. A, 1956, pp. 195–201.

Chem. & Eng. News, July 27, 1959, p. 40.